United States Patent
Miller

(10) Patent No.: US 8,620,871 B2
(45) Date of Patent: Dec. 31, 2013

(54) DETERMINING COMPONENT USAGE FOR DATABASES

(75) Inventor: Cheryl R. Miller, Edwardsville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 452 days.

(21) Appl. No.: 12/563,761

(22) Filed: Sep. 21, 2009

(65) Prior Publication Data

US 2011/0071985 A1  Mar. 24, 2011

(51) Int. Cl.
 G06F 17/00 (2006.01)
(52) U.S. Cl.
 USPC .......................................... 707/675; 707/679
(58) Field of Classification Search
 USPC .......... 707/640, 672, 675, E17.001, E17.008, 707/E17.01, E17.122, 999.2, 999.202
 See application file for complete search history.

(56) References Cited

U.S. PATENT DOCUMENTS

| | | | |
|---|---|---|---|
| 5,870,763 A | 2/1999 | Lomet | |
| 5,946,698 A | 8/1999 | Lomet | |
| 6,516,416 B2 | 2/2003 | Gregg et al. | |
| 7,035,841 B2 | 4/2006 | Chidlovskii | |
| 7,246,254 B2 | 7/2007 | Alur et al. | |
| 7,383,287 B2 | 6/2008 | Ellison et al. | |
| 7,447,710 B2 | 11/2008 | Sampath et al. | |
| 7,685,187 B2 | 3/2010 | Hutchison et al. | |
| 7,698,401 B2 | 4/2010 | Atluri | |
| 2003/0130994 A1* | 7/2003 | Singh et al. | 707/3 |
| 2004/0143713 A1* | 7/2004 | Niles et al. | 711/162 |
| 2005/0005233 A1* | 1/2005 | Kays et al. | 715/500.1 |
| 2005/0131711 A1* | 6/2005 | Bouriant et al. | 705/1 |
| 2009/0313503 A1 | 12/2009 | Atluri et al. | |
| 2010/0169466 A1 | 7/2010 | Atluri et al. | |
| 2010/0169592 A1 | 7/2010 | Atluri | |
| 2010/0228717 A1* | 9/2010 | Meinsen | 707/708 |
| 2010/0241977 A1* | 9/2010 | Greetham | 715/764 |

FOREIGN PATENT DOCUMENTS

WO  WO 9618939 A2 * 6/1996

* cited by examiner

Primary Examiner — Ajay Bhatia
Assistant Examiner — Randall Burns
(74) Attorney, Agent, or Firm — Scott P. Zimmerman, PLLC

(57) ABSTRACT

Determinations are made regarding which database components are installed with a database installation. A recovery manual generator accesses system recovery data to generate a system recovery manual based on the system recovery data. A database feature auditor determines, based in part on the system recovery data, which database features are installed at database installations, which may be at multiple database sites.

13 Claims, 3 Drawing Sheets

DETERMINING COMPONENT USAGE FOR DATABASES

BACKGROUND

1. Field of the Disclosure

The present disclosure relates to database management.

2. Description of the Related Art

Databases offered by software makers may have multiple database components available for installation at a database administrator's option. Some of these components may be optional and may, in order to be installed or used, require payment of a separate license fee.

DESCRIPTION OF THE EMBODIMENT(S)

Figure 1:
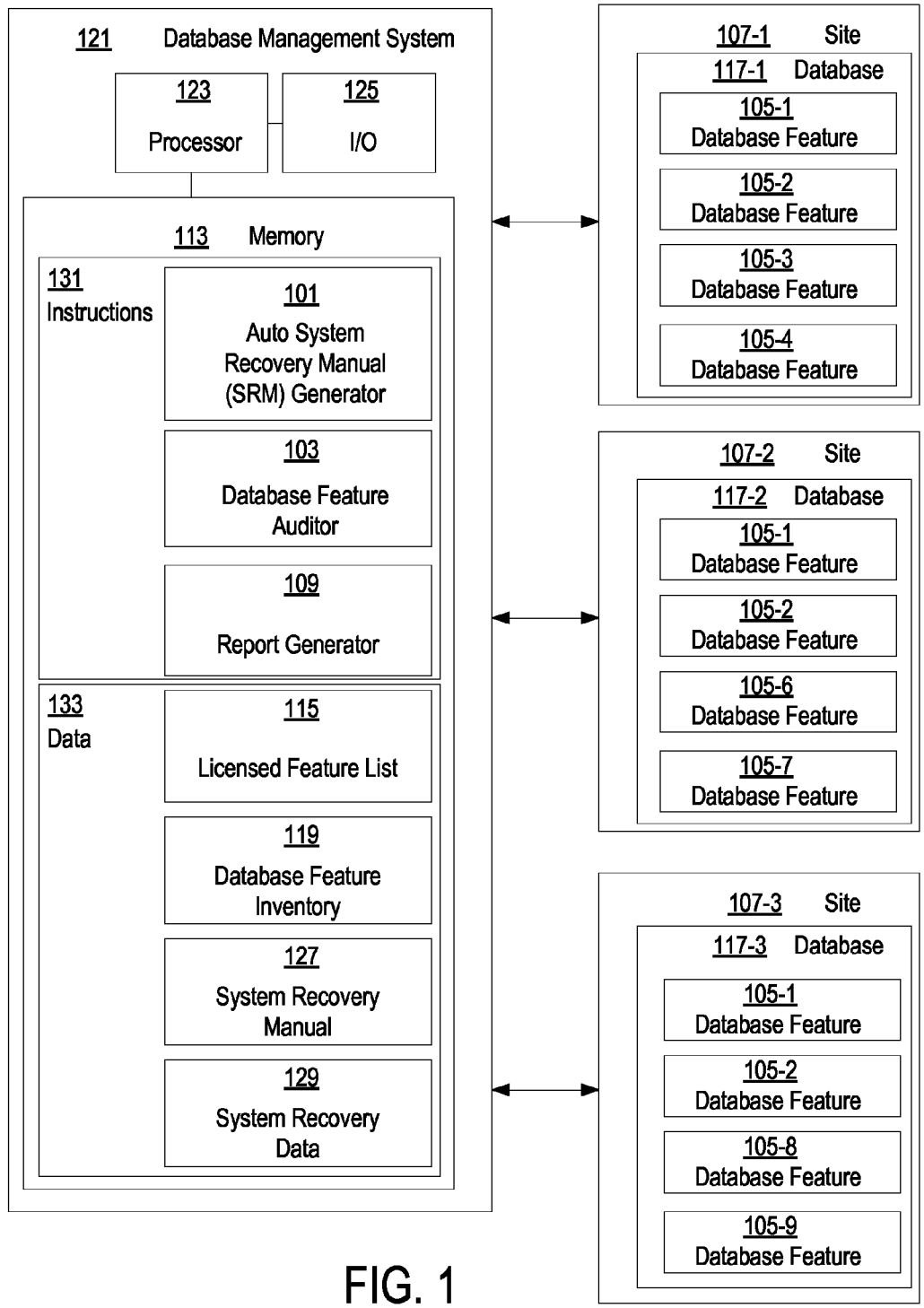
FIG. 1 depicts a database management system for determining component usage for databases.

In one aspect, disclosed systems relate to a database management system (DBMS) that includes a processor for executing a plurality of machine readable instructions embedded in a memory. Instructions enable accessing system recovery data for determining, based at least in part on the system recovery data, which database features of a plurality of available database features are installed at a database site and further determining which of the installed database features have been used at the database site. In some embodiments, further instructions enable a database feature auditor for determining which database features are installed at a database site. The determination of which database features are installed may be based in part on a generated system recovery manual (SRM/DBMS). In some embodiments, further instructions enable a recovery manual generator that may generate the SRM/DBMS. The generated SRM/DBMS may include a Hypertext Markup Language (HTML) document. In some embodiments, a database feature inventory is maintained that includes information (e.g., identity, installation date, use dates, licensing information, etc.) regarding the installed database features. Embodiments may include instructions for a report generator that generates a database feature inventory report based on stored data indicative of the installed database features. Information from the database feature inventory report may be used to verify compliance with applicable licensing requirements.

In another aspect, a disclosed method of operating a database includes collecting SRM/DBMS data from the database, determining which database features are installed at a plurality of data sites, and storing a database feature inventory indicative of the installed database features. An SRM/DBMS based on the system recovery data can be generated. Determining which database features are installed and which installed database features are used is conducted for a plurality of database sites and is based at least in part on the collected system recovery data. The method may include comparing installed database features to a plurality of licensed database features and generating a database feature inventory report based on a database feature inventory. The database feature inventory report may also include information on which of the database features have been used. The method may include generating XML instructions for generating a database feature report and generating an HTML document used to create an SRM/DBMS or containing elements of an SRM/DBMS. The method may further include, based on said comparing, determining if a database site is in compliance with licensing requirements for the installed database features. Determining said compliance may include determining which of the installed database features have been used at the database site.

In another aspect, a computer method includes determining system recovery data for a database installation and determining a database feature inventory from the system recovery data. A further determination of which database features included in the database feature inventory are used may be made. The system recovery data may be suitable for generating an SRM/DBMS, and the method may include, in some embodiments, generating an SRM/DBMS based on the system recovery data. Generation of the SRM/DBMS may occur on a scheduled recurring basis or may take place upon the occurrence of certain designated events such as the installation of new database feature. The computer method may include generating a database feature report from the database feature inventory. Information from the database feature report may be used to verify compliance with applicable licensing requirements or to otherwise verify installation and use of applicable database features. In addition, the computer method may include determining a license compliance rating by comparing the database feature inventory to a licensed feature database.

Accordingly, embodied systems collect information about licensable products (e.g., database components) installed and used with a database or other software application. In some cases, the database includes multiple features that are installed at a database administrator's option. In this and in other cases, installation of a feature or features may require additional license fees. In other instances, while installation of a feature or features may not require additional license fees, use of the installed feature or features may require additional license fees. Collection of installation and use information by these embodied systems permits compliance with applicable licensing requirements. In some cases, database installations for an enterprise may include installations at multiple sites, with the possibility that each site may have a unique database installation having a unique combination of optional features installed. A database administrator or software licensor may wish to audit database installations at one or more sites to determine which features of the database are installed. A further determination of which installed database features are used at one or more sites may be made. Accordingly, embodied systems may facilitate the adjustment or verification of an enterprise license agreement or site license agreement to ensure installed features of a database are properly accounted and used.

In accordance with disclosed embodiments, information regarding a database installation may be determined by accessing system recovery data. Access of system recovery data may take place through a SRM/DBMS. In many cases system recovery data is collected and may be used by a database administrator for reinstalling a database after a hardware or software failure. Some database administrators use the database installation data to create an SRM/DBMS. The SRM/DBMS may be auto-generated. The SRM/DBMS may be an HTML document. In accordance with disclosed embodiments, an XML file may be generated that collects any necessary information for generating an SRM/DBMS, and the collected information includes information regarding database component installations (e.g., what database components or options are installed at various sites) and use information (e.g., what installed database components are used at various sites). From the XML file, disclosed systems may generate an HTML document for reinstallation of a database installation. In this way, information used for generating an SRM/DBMS may be used to generate a database inventory report for a large enterprise. Information may be collected on licensed database options and used to create a compliance rating for one or more sites having database installations. The information may include installed database features and whether such installed features have been used. Compliance ratings may be utilized to validate enterprise licensing programs. Collection of the information and generation of the SRM/DBMS may occur on a recurring or other scheduled basis or may take place upon the occurrence of certain designated events such as the installation of new database features.

The SRM/DBMS may include information regarding, in the event that a reinstallation is necessary, which version of a database or database options need to be installed. Also, the SRM/DBMS may contain information regarding what, if any, additional patches (e.g., security patches) need to be installed. In operation, a database administrator may run a set of scripts or commands to automatically reinstall a database installation based upon the SRM/DBMS created for one or more database installations.

An SRM/DBMS and the corresponding system recovery data may be generated automatically and periodically by querying database servers to determine what database features (i.e., options or components) are installed, how they are installed, how often they are used, and the like. The information may be collected at a central repository by a data processing system (e.g., computer). The data processing system may be operated by an auditor or an enterprise database administrator. However, in accordance with disclosed embodiments, it may be unnecessary for an auditor or enterprise database manager to log into an enterprise manager console to determine which database features are installed and used at various sites. Instead, the auditor or enterprise database manager may refer to a database feature inventory or a licensed feature list generated by a report generator. In some embodiments, the report generator may generate the licensed feature list automatically upon a scheduled basis or as a result of the occurrence of a designated event such as the installation or removal of some or all options or components.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring to the figures, FIG. 1 depicts DBMS 121 which includes processor 123 and input/output module 125 for communicating with database sites 107-1, 107-2, and 107-3. As shown, DBMS 121 includes memory 113 with instructions 131 and data 133. Instructions 131 include auto SRM generator 101, database feature auditor 103, and report generator 109. Data 133 includes licensed feature list 115, database feature inventory 119, system recovery manual 127, and system recovery data 129.

As shown, database site 107-1 includes database 117-1 with four database features installed. Specifically database features 105-1, 105-2, 105-3, and 105-4 are installed. Similarly, database site 107-2 includes database 117-2 with two database features installed in common with database site 107-1 (and also in common with database site 107-3). Specifically, each of the database sites 107 have database feature 105-1 and database feature 105-2 installed. Unique to database site 107-2, as depicted, is the installation of database feature 105-6 and database feature 105-7. Similarly, unique to database site 107-3, which includes database 117-3, is the installation of database feature 105-8 and database feature 105-9. Similarly, unique to database site 107-1 is the installation of database feature 105-3 and database feature 105-4. Accordingly, database sites within an enterprise may have database installations which have a unique combination of options installed. It will be appreciated that the number of database sites 107-1, 107-2, and 107-3 and database features 105-1 through 105-9 depicted in FIG. 1 are for illustrative purposes and that any number of database sites and database features may be employed for use with embodiments. The database administrator, in accordance with disclosed embodiments, may determine which database features are installed and used at various database sites for the purpose of creating database feature inventory 119. Information from the database feature inventory may be used to create a compliance rating for one or more database sites having database installations. These compliance ratings may be utilized to validate enterprise licensing programs.

As shown in FIG. 1, DBMS 121 includes processor 123 for executing instructions 131, which are a plurality of machine readable instructions, embedded in memory 113. As shown, instructions 131 include auto SRM generator 101 for accessing system recovery data related to database sites 107. After accessing the system recovery data related to the installation of database sites 107, the data may be stored as system recovery data 129. The system recovery data 129 is used to generate SRM 127. Database feature auditor 103 determines, based at least in part on system recovery data 129, which database features of a plurality of available database features are installed at a database site. Database feature auditor 103 may also determine, based at least in part on system recovery data 129, which installed database features at a database site have been used. Determining which database features are installed and used at a database site may also include accessing database feature inventory 119 or a database feature report generated by report generator 109. The plurality of available database features (not depicted) may be stored within data 133, and may include licensed feature list 115 which can include parameters (e.g., permissions, costs, etc.) associated with the licensing of database options for each database site 107. Information contained within licensed feature list 115 may be used to determine compliance of each database site 107 with applicable licensing requirements.

DBMS 121, as shown, maintains database feature inventory 119 which includes data for determining which database options are installed by databases 117-1, 117-2, and 117-3. Database feature inventory 119 may also include data for determining which installed database options in databases 117-1, 117-2, and 117-3 have been used. Report generator 109 can generate a database feature inventory report based on the installed database features. In some embodiments, auto SRM generator 101 invokes an XML document for collecting the system recovery data. A generated SRM/DBMS may include a HTML document. Automatic generation of the SRM/DBMS permits the SRM/DBMS to remain current and further permits the output of the SRM/DBMS to designated recovery databases. In some embodiments, the HTML document may be uploaded to platform specific websites.

Figure 2:
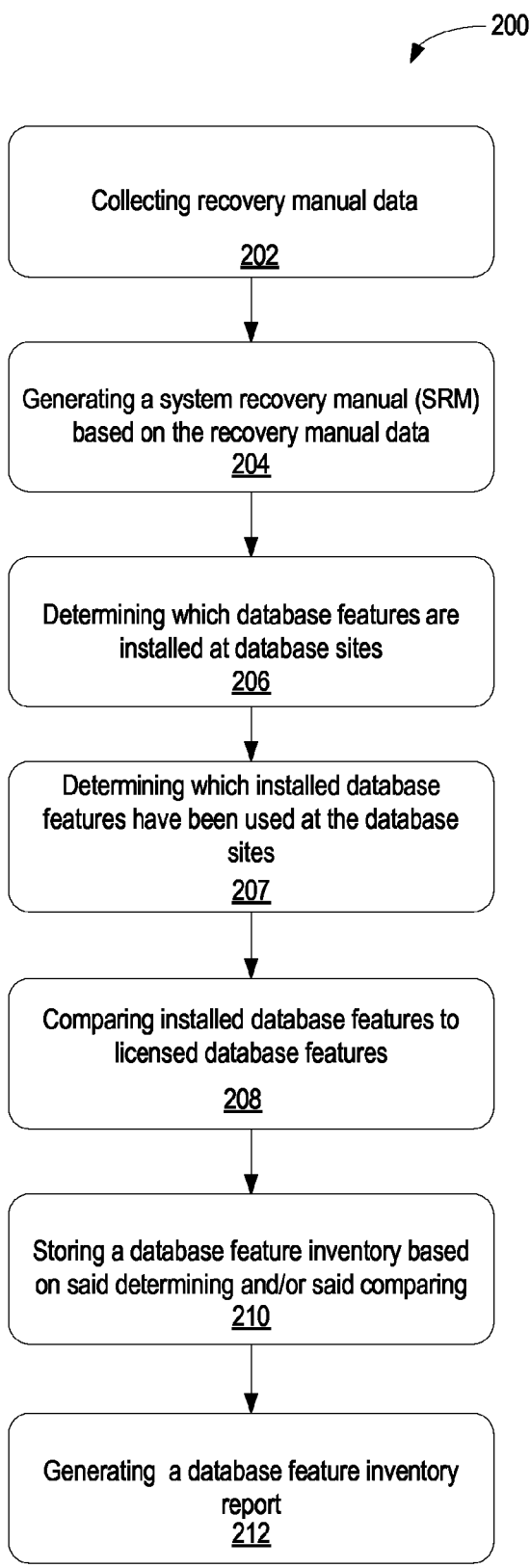
FIG. 2 depicts elements of a method for determining component usage or installation of databases.

As shown in FIG. 2, a method 200 for operating a database includes collecting (block 202) system recovery data and generating (block 204) a recovery manual (e.g., an SRM/DBMS) based on the system recovery data. Generation of the recovery manual may occur on a recurring scheduled basis or may take place upon the occurrence of certain designated events such as the installation of new database feature. A determination is made (block 206), for a plurality of database sites and based at least in part on the collected system recovery data, which database features are installed at the plurality database sites. A further determination may be made (block 207) which installed database features have been used at the plurality of database sites. As an optional aspect, installed database features may be compared (block 208) to licensed database features. A database feature inventory is stored (block 210) that is indicative of the installed database features and/or indicative of whether installed database features are used and if so, are licensed. As another optional aspect, a database feature inventory report may be generated (block 212) based on the database feature inventory. The database feature report may be constructed using XML instructions, for example. Generation of the database feature report may occur on a scheduled recurring basis or may take place upon the occurrence of certain designated events such as the installation of new database feature. Information from the database feature report may be used to create a compliance rating for one or more of the plurality of database sites. These compliance ratings may be utilized to verify installed and used database features at the database sites and to validate licensing programs at the database sites.

Figure 3:
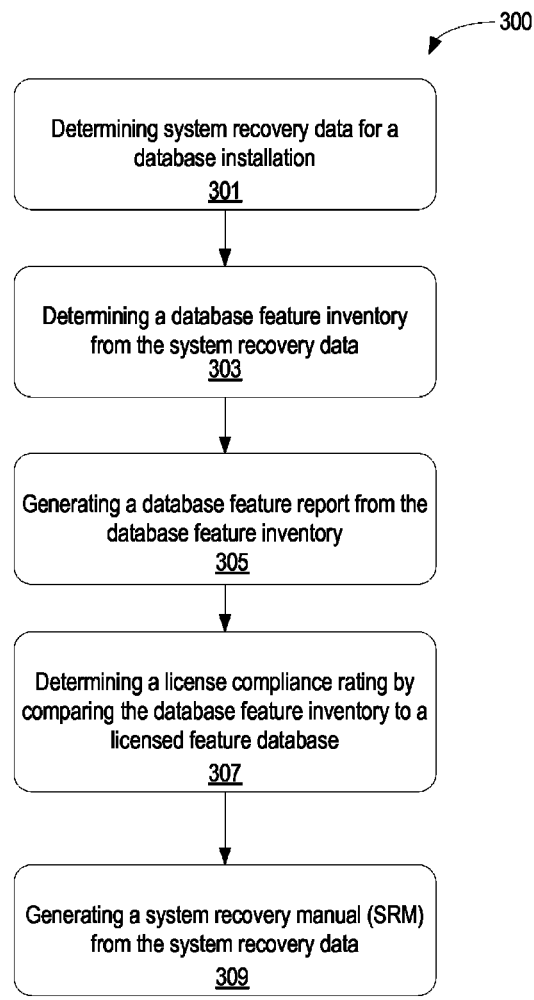
FIG. 3 depicts a method of operating a database that includes determining component usage or installation for databases.

As shown in FIG. 3, method 300 is a computer method and includes determining (block 301) system recovery data for a database installation. Determination of the system recovery data may occur on a recurring scheduled basis or may take place upon the occurrence of certain designated events such as the installation of new database feature. The system recovery data is suitable for generating an SRM/DBMS. The computer method further includes determining (block 303) a database feature inventory from the system recovery data. A database feature report is generated (block 305) from the database feature inventory. Determination of the database feature inventory and generation of the database feature report may occur on a recurring scheduled basis or may take place upon the occurrence of certain designated events such as the installation of new database feature. A license compliance rating is determined (block 307) by comparing the database feature inventory to a database of licensed features. The compliance rating may be utilized to verify or otherwise validate installation and use of database features and thereby ensure compliance with applicable licensing programs and requirements at the database installation. An SRM/DBMS is generated (block 309) from the system recovery data. Generation of the SRM may occur on a recurring scheduled basis or may take place upon the occurrence of certain designated events such as the installation of new database features. In accordance with disclosed embodiments, information regarding a database installation may be determined by accessing the corresponding SRM/DBMS. In many cases, the SRM/DBMS and the system recovery data contained therein may be used for reinstalling a database after a hardware or software failure.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A system, comprising:
   a processor; and
   memory storing instruction that when executed cause the processor to perform operations, the operations comprising:
   accessing system recovery data generated prior to a failure of a database site;
   determining, from the system recovery data, installed database features of a plurality of available database features that are installed at the database site;
   determining which ones of the installed database features have been in-use at the database site;
   generating a database feature inventory, wherein the database feature inventory is an extensible markup language file indicative of the installed database features and the in-use database features; and
   generating, from the database feature inventory, a hypertext markup language document having hypertext that facilitates a recovery from the failure of the database site.

2. The system of claim 1, further comprising generating a database feature report, based on the database feature inventory, indicating the installed database features.

3. The system of claim 2, wherein the database feature report further indicates the in-use database features.

4. The system of claim 2, further comprising:
   accessing licensing information indicating licensed database features which have been licensed for the database site under a license agreement; and
   determining a compliance rating indicative of a degree of compliance with the license agreement.

5. The system of claim 4, further comprising comparing the installed database features to the licensed database features.

6. The system of claim 4, further comprising comparing in-use database features to the licensed database features.

7. The system of claim 4, further comprising determining licensing fees based, in part, on the compliance rating.

8. A method of operating a database, comprising:
   retrieving, from memory, system recovery data generated prior to a failure of a database site;
   determining, by a processor from the system recovery data, installed database features of a plurality of available database features that are installed at the database site;
   determining, by the processor, which ones of the installed database features have been in-use at the database site;
   generating a database feature inventory, wherein the database feature inventory is an extensible markup language file indicative of the installed database features and in-use database features; and
   generating, from the database feature inventory, a hypertext markup language document having hypertext that facilitates a recovery from the failure of the database site.

9. A non-transitory memory storing instructions that when executed cause a processor to perform operations, the operations comprising:
   retrieving system recovery data generated prior to a failure of a database site;
   determining, from the system recovery data, installed database features of a plurality of available database features that are installed at the database site;
   determining which ones of the installed database features have been in-use at the database site;
   generating a database feature inventory, wherein the database feature inventory is an extensible markup language file indicative of the installed database features and in-use database features; and generating, from the database feature inventory, a hypertext markup language document having hypertext that facilitates a recovery from the failure of the database site.

10. The memory of claim 9, wherein the operations further comprise:
   accessing licensing information indicating licensed database features which have been licensed for the database site under a license agreement; and
   determining a compliance rating indicative of a degree of compliance with the license agreement.

11. The memory of claim 10, wherein the operations further comprise comparing the installed database features to the licensed database features.

12. The memory of claim 10, wherein the operations further comprise comparing in-use database features to the licensed database features.

13. The memory of claim 10, wherein the operations further comprise determining licensing fees based, in part, on the compliance rating.

* * * * *